United States Patent [19]

Pichl et al.

[11] 4,241,620
[45] Dec. 30, 1980

[54] BALANCE WHEEL

[75] Inventors: Heinz Pichl, Uppsala, Sweden;
Günther Kossek, Gechingen, Fed.
Rep. of Germany

[73] Assignee: AB Volvo Penta, Gothenburg,
Sweden

[21] Appl. No.: 835,037

[22] Filed: Sep. 20, 1977

[30] Foreign Application Priority Data

Sep. 22, 1976 [SE] Sweden ............................. 7610483

[51] Int. Cl.³ .................... G05G 1/00; H02H 21/12
[52] U.S. Cl. ................................ 74/573 R; 310/74;
310/156; 74/572
[58] Field of Search .................. 310/156, 74; 74/572,
74/574

[56] References Cited

U.S. PATENT DOCUMENTS

| 2,945,138 | 7/1960 | Strang ................................ 310/153 |
| 3,246,187 | 4/1966 | Iemura ................................ 310/156 |
| 3,947,710 | 3/1976 | Miyamoto ........................... 310/74 |
| 3,953,752 | 4/1976 | Bannon ............................... 310/156 |

FOREIGN PATENT DOCUMENTS

| 979511 | 1/1965 | United Kingdom ..................... 310/74 |
| 544049 | 5/1977 | U.S.S.R. ............................... 310/74 |

Primary Examiner—Samuel Scott
Assistant Examiner—Wesley S. Ratliff, Jr.
Attorney, Agent, or Firm—Arthur G. Yeager

[57] ABSTRACT

The invention relates to a balance wheel for rotating machines, especially combustion engines, including, for example, outboard motors. Hitherto, such balance wheels or flywheels have been manufactured from different non-ferrous metals as zinc or aluminum alloys, and in one embodiment they have the shape of an inverted pot having low side walls. On the inner side of the walls balance wheel magnets, that is, permanent magnets for the ignition or generator system of the motor, are attached, and the other elements of the ignition or generator systems are disposed outwardly around the output shaft of the engine and inside the "pot". However, for obtaining a suitable magnetic field, the permanent magnets are not attached directly to the balance wheel of a non-magnetic material—zinc or aluminum—but on a ring of magnetic material, for instance steel, which in its turn is attached to the balance wheel.

17 Claims, 4 Drawing Figures

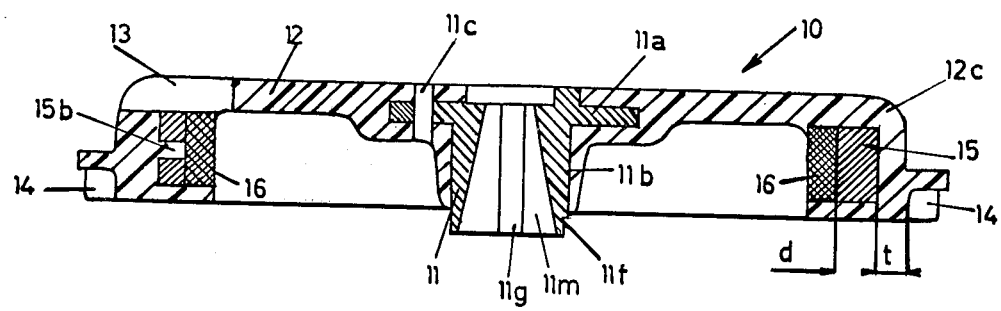
FIG. 1
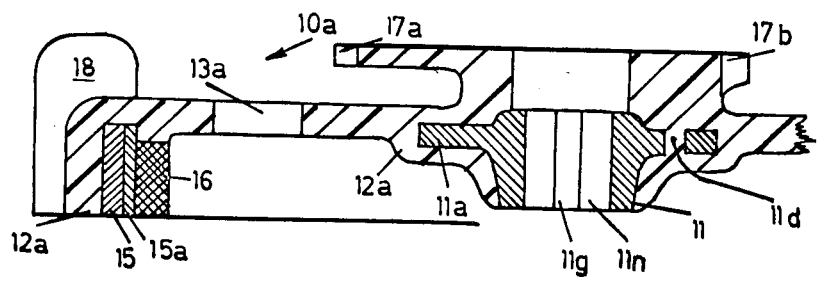
FIG. 2
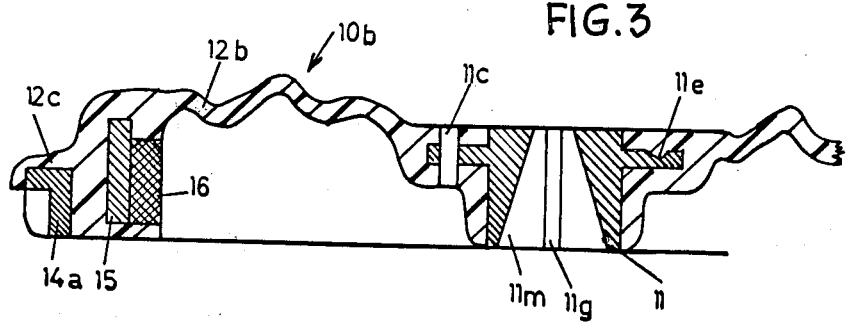
FIG. 3
FIG. 4

BALANCE WHEEL

As known, the object of a balance wheel is to act as an accumulator of mechanical energy. The efficiency or inertia of the balance wheel in this respect is determined by the relation $G \times D^2$, where G stands for the mass and D for the diameter. The larger the rotating machine is, the higher value is necessary for the expression $G \times D^2$. However, the larger the mass of an object is, the higher is also the weight thereof. Therefore, efficient balance wheels are relatively heavy, which is regarded as a drawback, especially what concerns more or less carriable or transportable motors, as for instance outboard motors or the like. But also in connection with stationary rotating machines, too heavy balance wheels have an adverse effect on the lifetime of the crank shaft and crank shaft main bearings.

Objects of the present invention are to provide a balance wheel which has a reduced weight for a given inertia and which may be manufactured in a simpler and cheaper way, especially as to the attachment of the balance wheel magnets. These objects are achieved in the manner hereinafter explained. The invention is based on the consideration that the mass of the peripherial portions of a balance wheel, i.e. the portions to which the largest diameter "D" applies, is a determining factor as to efficiency, and that consequently the steel ring which is used for magnetic reasons can be made the decisive part of the balance wheel also in respect of the mechanical function thereof, and that this ring then can be attached to the hub of balance wheel by means of a solid or perforated wheel disc of plastics, for instance glass fiber reinforced polyester, nylon, or the like, and whereby the hub, considering the aspect of wear resistance, is, preferably, also made of metal.

While a zinc alloy has a specific gravity of about 7.0 and an aluminum alloy has a specific gravity of about 2.9, the plastics of the type mentioned have specific gravities of about 1.01–1.40. A balance wheel having a steel ring molded into plastics will be substantially lighter than a balance wheel having the same $G \times D^2$ value wherein a steel ring is attached to a zinc or aluminum alloy. In comparison to a balance wheel of aluminum, a weight reduction of 30–40% is obtained and in comparison to a balance wheel of zinc injection molded material, or to a wheel entirely of steel, the reduction is about 70%, always with the same $G \times D^2$ value.

Extrusion tools for manufacturing a balance wheel of plastics having a metal hub molded therein and a peripheral steel ring molded therein have a considerably longer lifetime than tools for producing balance wheels consisting entirely of metal which results in a saving. A further saving is obtained in that the balance wheel according to the invention does not require any finishing working and/or painting. Furthermore, an important advantage consists in the fact that, in one and the same mold, balance wheels with different inertias can be produced by using steel rings with different thicknesses and, therefore, of different weight or mass.

According to the invention, a decisive advantage is obtained in respect of the balance wheel magnets. These permanent magnets are, to an increasing extent, manufactured as so-called oxide magnets consisting of particles of permanent magnetic metal oxides bonded together in various ways. Some very advantageous oxide magnets consist, for instance, of iron oxide particles bonded by epoxy resins and do not withstand the high temperatures that occur in the production of injection molded articles of aluminum or zinc. Thus, these magnets cannot be embedded into such metal balance wheels by injection molding, but they have to be cemented onto the finished product. This drawback is eliminated in the balance wheel according to the present invention, since the lower temperatures occurring in the manufacture of a balance wheel of plastics do not harm such magnets. The metallic hub and the peripheral steel ring, as well as the balance wheel magnets, may be incorporated in the product in the same one manufacturing operation—extrusion molding or the like—thereby to provide by such single operation a completely finished balance wheel. Moreover, as has been mentioned, no finishing or other working of the wheel is subsequently required.

The mold for the production of a balance wheel of plastics may be readily so shaped that all requirements in a particular case may be fulfilled, and also in such a way, with regard to the wall thickness of the end product, that substantially no shrinkage occurs during the solidification. The balance wheel may be provided with fan blades along its periphery, and, in its central area, it may be provided with a groove for a starting rope or with gear teeth for engagement by the starter. Alternatively, it may be provided with a peripheral groove for the starting rope and/or with a peripheral gear ring for engagement with the pinion of the starter motor, and such gear ring or gear teeth may be defined by a further molded-in metallic component, if desired.

In a preferred embodiment, the plastic portion of the balance wheel between the hub and the periphery is given a corrugated or wave-shaped profile in cross-section, so that the balance wheel has the appearance of an aneroid diaphragm. Thereby, due to increased elasticity, compensation is obtained for any tumbling movements the motor may be affected by.

In the following, the invention will be further elucidated with reference to the accompanying drawing which shows exemplary embodiments, and where FIG. 1 is a schematic section through a first embodiment of a balance wheel according to the invention, FIG. 2 schematically and in section shows two other embodiments, FIG. 3 shows a balance wheel having a corrugated profile, and FIG. 4 shows, on a reduced scale, a steel band from which the peripheral ring may be manufactured.

According to FIG. 1, a balance wheel 10 comprises a central hub 11 of metal, steel, aluminum, zinc or the like, i.e. basically a metal of which previously the entire balance wheel has been manufactured. The hub has a conical internal opening 11m for the motor shaft and is provided with a flange 11a for better contact with the plastic portion 12 of the balance wheel. For securing said contact further, pin or screw elements 11c may be arranged and/or the external surface 11b of the hub may be given a contact promoting shape, for instance by being provided with ridges, ribs, or the like. For the same reason, through openings 11d (FIG. 2), or bottom openings 11e (FIG. 3), into which the plastic material can penetrate, may be arranged in the hub 11, preferably in the flange 11a. The lower portion of the hub 11 is provided with a peripheral cam surface 11f for the breaker of the ignition system, as seen in FIG. 1.

At the inner side of the bent peripheral, or downwardly extending wall portion 12c of the plastic part 12, a steel ring 15 is molded-in. In the left hand part of the flywheel as seen in FIG. 1, the steel ring is shown thinner than in the right hand part, to demonstrate that steel rings of different cross-sectional shapes and sizes may be used when manufacturing balance wheels in one and the same mold. Accordingly, either the internal diameter d and/or the wall thickness t may be altered, whereby balance wheels may be produced with identical internal and external diameters and yet with different inertias, depending upon the ratio between the thickness of the steel ring 15 and the wall thickness t. While the ring 15 is preferably of steel, other preferably high tensile strength paramagnetic materials may be employed, the functions of the ring being to provide bursting strength and a magnetic path for the permanent magnets.

At the production in an extrusion mold, the steel ring 15 is placed on supports which leave openings 13 in the finished product, which openings preferably are used as venting openings. At the lower external part of the peripheral portion 12c gear teeth 14 are molded-in for engagement with the pinion of a not disclosed starter motor. At the internal side of the steel ring 15, one or several balance wheel magnets 16 and possibly, at diametrically opposed locations, one or several not shown balance weights of non-magnetic material are arranged. Instead of having separate balance weights, the mass of the plastic may be increased at respectively opposite locations of the balance wheel. The magnets 16 are molded-in into the plastic part 12 in the same way as the steel ring 15, i.e. in the finished product they are surrounded by the solidified plastics so as to be maintained in position by shape engagement. Preferably, the steel ring 15 is provided with equally distributed openings 15b through which during the extrusion operation the plastics may pass also between the upper and lower edges of the steel ring 15. The hub 11 is interiorly provided with a wedge groove 11g for attachment, such as by means of a key, to the motor shaft. By means of said wedge groove, possibly in co-operation with the elements 11c or openings 11d, 11e, the position of the magnets 16 is positively defined relative to the motor shaft.

In FIG. 2 is shown a balance wheel 10a which above the metal hub 11, which in this case has a cylindrical internal opening 11n, is provided with a plastic hub with a groove 17a for a starting rope or, alternatively, with engagement teeth 17b for co-operation with a starting motor gear. However, it will be recognized that a groove for a starting rope also may be arranged in the peripheral portion 12c. In the embodiment according to FIG. 2, fan blades 18 are molded onto said peripheral portion 12a and the adjacent portions of the inner zone of the plastic element 12a. The steel ring 15 may be supplemented by an auxiliary ring 15a for increasing the inertia as shown. In the plastic part 12a, openings 13a of any appropriate desired shape may be arranged for further reducing the weight of the balance wheel. The openings 13a may, for example, be cylindrical.

According to FIG. 3, the plastic part 12b of a balance wheel 10b is seen to have an annularly corrugated, wave-shaped profile which, seen from above, represents concentric wave crests and wave valleys, for instance, as to be similar to an aneroid diaphragm. Such corrugated shape substantially improves the elasticity for compensating the tumbling movements which due to the yaw or gyroscopic forces may arise with a boat motor during operation and which also may occur with other portable motors, particularly motors which may move or turn during operation. On the lower external part of the peripheral portion 12c, there is a metallic gear ring 14a molded-in which has the same function as the molded-in gear teeth 14 in FIG. 1.

According to FIG. 4, the steel ring 15, 15a is preferably manufactured from a straight steel band which is provided with openings 15b and which is rolled-in and welded together at its ends 15c, 15d. While with a balance wheel made for instance from a zinc alloy, there always is the risk that the wheel may burst from the centrifugal forces at excessive revolutions per minute. Such a risk is greatly reduced or substantially eliminated with the balance wheel according to the present invention, wherein the plastic part has a very small mass and the peripheral ring consists of a welded-together steel band. It will be understood that the peripheral ring basically also may consist of any other metal than steel, provided that the respective metal has sufficient mass and strength, and also that plastics of other types than glass fiber reinforced polyester or nylon may be used for the plastic part. A balance wheel according to the invention may also have other profiles than the pot-shape shown, and may, for example, be in the shape of a planar disc with an unbent peripheral portion, that is, without downturned peripheral walls, or it may be of other configurations as will be apparent to those skilled in the art.

What is claimed is:

1. A flywheel for an internal combustion engine, comprising a thick peripheral rim portion, a thick central portion and a thin disc portion extending outwardly from said central portion to said rim portion, all said portions being integrally molded of plastic material; a metal hub molded into said central portion; a closed metal ring rigidly molded into said rim portion and extending along the entire periphery thereof; at least one permanent magnet adjacent said ring and extending only along a part of the periphery of the said rim portion, said one magnet being fixed into said rim portion by being embedded therein by shape engagement.

2. The combination according to claim 1 wherein said permanent magnet comprises bonded metal oxide particles.

3. The combination according to claim 1 wherein said plastic material is nylon.

4. The combination according to claim 1 wherein said ring is of paramagnetic metal and said permanent magnet means is in contact with said ring.

5. The combination according to claim 1 wherein exposed metal gear tooth means are disposed outwardly around and moldedly bonded to said rim portion.

6. The combination according to claim 1 wherein said disc portion between said central portion and said rim portion is annularly corrugated.

7. The combination according to claim 1 wherein said ring comprises a steel strap element having welded-together opposite ends and being provided with a plurality of perforations therethrough.

8. The combination according to claim 1 wherein said disc comprises an integral projecting hub portion of said plastic material and including an outer surface portion which comprises starting means.

9. The combination according to claim 8 wherein said starting means comprises a groove for receiving a starting rope.

10. The combination according to claim 8 wherein said starting means comprises metal tooth means molded into said hub portion.

11. The combination according to claim 1 wherein said disc is provided with venting openings extending from said ring through the surface of said disc.

12. The combination according to claim 1 wherein said ring is of paramagnetic metal.

13. The combination according to claim 12 wherein said ring is of steel.

14. The combination according to claim 1 wherein said plastic material is nylon.

15. A flywheel for a combustion engine comprising a wheel disc of molded plastic material, a metal hub molded into the central portion of said wheel disc, permanent magnet means disposed spacedly from said hub and molded into said wheel disc, and a ring of high tensile strength material having a tensile strength greater than the tensile strength of said plastic material and a specific gravity more than about twice the specific gravity of said plastic material disposed adjacent the outer periphery of said disc outwardly of said magnet means and molded into said disc.

16. The combination according to claim 15 wherein said ring is of metal.

17. The combination according to claim 15 wherein said ring material is paramagnetic and is in contact with said magnet means.

* * * * *